Figure 1:
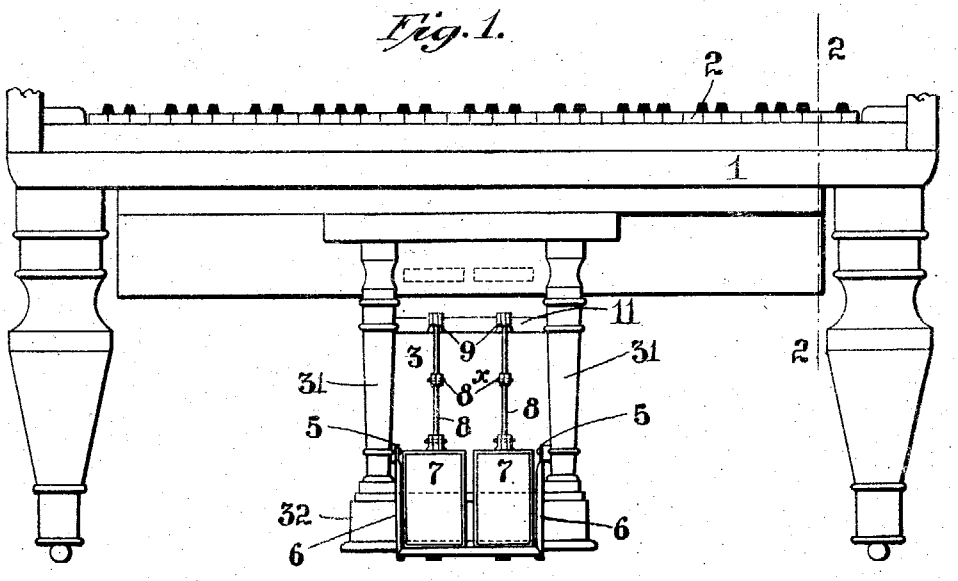

E. S. VOTEY.

MECHANICAL MUSICAL INSTRUMENT.

APPLICATION FILED APR. 24, 1908.

Reissued Jan. 11, 1910.

13,076.

2 SHEETS—SHEET 1.

WITNESSES:

E. M. Kobes

B. J. Daniels

INVENTOR

E. S. Votey

BY

Osear F. Gunz his ATTORNEY

NORRIS PETERS, INC. LITHO., WASHINGTON, D. C.

E. S. VOTEY.
MECHANICAL MUSICAL INSTRUMENT.
APPLICATION FILED APR. 24, 1908.
Reissued Jan. 11, 1910.
13,076.
2 SHEETS—SHEET 2.
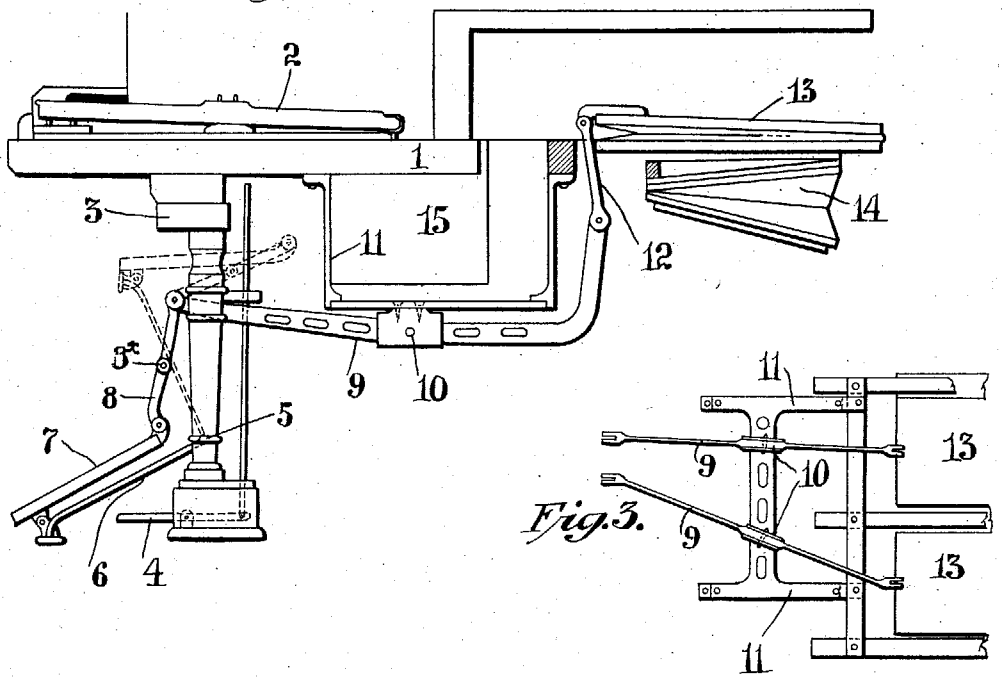
WITNESSES:
C. O. Mitchell
B. J. Daniels
INVENTOR
E. S. Votey
BY Oscar F. Green
his ATTORNEY
NORRIS PETERS, INC., LITHO. WASHINGTON, D. C.

UNITED STATES PATENT OFFICE.

EDWIN S. VOTEY, OF SUMMIT, NEW JERSEY, ASSIGNOR TO THE AEOLIAN COMPANY, OF NEW YORK, N. Y., A CORPORATION OF CONNECTICUT.

MECHANICAL MUSICAL INSTRUMENT.

13,076. Specification of Reissued Letters Patent. Reissued Jan. 11, 1910.

Original No. 825,948, dated July 17, 1906, Serial No. 289,761. Application for reissue filed April 24, 1908. Serial No. 429,108.

*To all whom it may concern:*

Be it known that I, EDWIN S. VOTEY, a citizen of the United States, and a resident of Summit, in the county of Union and State of New Jersey, have invented certain new and useful Improvements in Mechanical Musical Instruments, of which the following is a specification.

My invention relates to pneumatically operated musical instruments, as pianos, and particularly to pianos having horizontally disposed cases, as square or grand pianos.

It provides a convenient arrangement of the various pneumatic parts for operating the striking mechanism and for adjusting the pedals either into or out of operative position in which latter position they will not interfere with the use of the ordinary pedals mounted on the pedal-support or lyre of the instrument.

The invention also consists of combinations of parts which will be specified in the claims.

In the drawings, Figure 1 is a front elevation of a piano embodying my invention. Fig. 2 is a vertical section through the line 2—2, Fig. 1. Fig. 3 is a partial inverted plan view of the instrument, showing the connections.

In the drawings, 1 designates the case of a piano, of which 2 represents the keys. Depending from the bottom portion of the piano 1 is a lyre or pedal support 3, in which, as shown, are pivoted the usual pedals 4, adapted to produce piano or forte effects when the instrument is manually played by means of the keys 2. Pivoted at 5 on the pedal support 3, which, as shown, consists of two vertically disposed portions 31 and a base 32 connecting these, are links 6, the forward ends of which are in turn pivoted to the heel or forward end of a bellows pedal 7, the toe or rear end of which is connected by a link 8, jointed at $8^x$ to the forward end of a lever 9, which is pivoted at 10 to a dependent frame 11, secured at the lower side of the casing of the instrument. The levers 9 are bent at their rear ends, as shown in Fig. 2, and are connected by a link 12 to the movable board 13 of a pumping bellows, which is connected by usual means (not shown) to a wind chest 14. Supported beneath the case 1 of the instrument and in the present instance extending through the supporting frame 11 is an action case 15, within which may be contained any desired parts of the pneumatic action of the instrument.

The operation of the device will be easily understood from an inspection of the drawings. It will be seen that the bellows pedals 7 are conveniently placed in their operative position (shown in full lines in Fig. 2) in which position they are maintained by the links 6, by which they are connected to the pedal support 3, and by the links 8, which connect them to the forward end of the levers 9, and that in this position they are positioned to operate through the lever 9 the pumping bellows 13. When it is desired to play the instrument manually, the bellows pedals 7 may be raised to the position shown in dotted lines, Fig. 2, the pivotal connection of the links 6 and 8 and the joint $8^x$ in the link 8 permitting this movement from the operative position in front of the pedal support 3 to the non-operative position adjacent and in the present instance above the forward end of the levers 9. In this latter or non-operative position the ordinary expression pedals of the instrument may be readily reached by the feet of the player.

It is obvious that certain mechanical changes may be made in my device without departing from the invention.

What I claim is:—

1. In a self playing grand piano, the combination with a horizontally disposed case, pneumatic mechanism and a depending pedal support, of pedals and connections for actuating the pneumatic mechanism, said pedals being foldably secured to said pedal support, substantially as described.

2. In a self playing grand piano, the combination with a horizontally disposed case, pneumatic mechanism and a depending pedal support, of pedals and folding connections for actuating the pneumatic mechanism, said pedals being foldably secured to said pedal support, substantially as described.

3. In a self playing grand piano, the combination with a horizontally disposed case, pneumatic mechanism and a depending pedal support, of pedals and connections for actuating the pneumatic mechanism, said pedals being foldably secured to said pedal support, and means for supporting said pedals beneath the frame when folded up, substantially as described.

4. In a self playing grand piano, the combination with a horizontally disposed case and a depending pedal support and pneumatic mechanism supported by said case, of pedals and connections for actuating the pneumatic mechanism, said pedals being foldably secured to said pedal support, and provided with folding connections, and means for supporting said pedals beneath the frame, substantially as described.

5. In a pneumatically operated piano, a horizontally disposed case, a pedal support, a bellows mounted at the under side of said case behind said pedal support, a lever for operating said bellows and extending forwardly therefrom beneath said case, a bellows pedal, and links connecting said pedal to said support and to said lever, whereby said pedal may have movement from operative to non-operative position.

6. In a pneumatically operated piano, a horizontally disposed case, a pedal support, a bellows mounted at the under side of said case behind said pedal support, a lever for operating said bellows and extending forwardly therefrom beneath said case, and links, one of which is jointed, connecting said pedal to said support and to said lever, whereby said pedal may have movement from operative to non-operative position.

7. In a pneumatically operated piano, a horizontally disposed case, a pedal support, a bellows mounted at the under side of said case behind said pedal support, a lever for operating said bellows and extending forwardly therefrom beneath said case, a bellows pedal, a link connecting said pedal to said support, and a jointed link connecting said pedal to said lever, whereby said pedal may have movement from operative to non-operative position.

8. In a pneumatically operated piano, a horizontally disposed case, a pedal support including two vertically disposed portions, a bellows mounted at the under side of said case, a lever for operating said bellows and extending forwardly therefrom beneath said case, a bellows pedal, a link connection from the rear end of said bellows pedal to said lever, and a second link connection from the forward end of said bellows pedal to said pedal support, whereby said bellows pedal may be moved downwardly into operative position and upwardly and rearwardly into inverted position between said vertically disposed portions.

In testimony whereof I have signed this specification in the presence of two subscribing witnesses.

EDWIN S VOTEY.

Witnesses:

HERMANN B. SCHAAD.

T. NEEL.